United States Patent
Hampson et al.

(10) Patent No.: US 10,454,873 B2
(45) Date of Patent: Oct. 22, 2019

(54) METHODS, SYSTEMS, AND MEDIA FOR PRESENTING A REMINDER TO VIEW CONTENT

(71) Applicant: Google LLC, Mountain View, CA (US)

(72) Inventors: Courtney Hampson, Sunnyvale, CA (US); Jason Robert Richard Sanio, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 607 days.

(21) Appl. No.: 15/057,421

(22) Filed: Mar. 1, 2016

(65) Prior Publication Data

US 2017/0257337 A1 Sep. 7, 2017

(51) Int. Cl.
*G06F 3/048* (2013.01)
*H04L 12/58* (2006.01)
*G06F 3/0484* (2013.01)

(52) U.S. Cl.
CPC ............ *H04L 51/24* (2013.01); *G06F 3/0484* (2013.01); *H04L 51/08* (2013.01)

(58) Field of Classification Search
CPC ............ G06F 17/30867; G06F 3/0482; G06F 17/30598; G06F 3/04842; G06F 17/30017; G06F 17/30554; G06F 3/011; G06F 3/0481; G06F 3/04817; G06F 3/0488; G06F 3/04883; G06F 3/04886
See application file for complete search history.

(56) References Cited

U.S. PATENT DOCUMENTS

| | | | |
|---|---|---|---|
| 7,512,900 B2 * | 3/2009 | Lynch | G06F 17/30663 715/708 |
| 9,055,343 B1 | 6/2015 | Lewis et al. | |
| 9,071,855 B1 | 6/2015 | Casey | |
| 2008/0229351 A1 * | 9/2008 | Torimaru | H04N 21/4668 725/14 |
| 2016/0021051 A1 | 1/2016 | Peterson et al. | |

(Continued)

FOREIGN PATENT DOCUMENTS

WO 2014055706 4/2014

OTHER PUBLICATIONS

International Search Report and Written Opinion dated Mar. 28, 2017 in International Patent Application No. PCT/US2016/066,170.
(Continued)

*Primary Examiner* — Di Xiao
(74) *Attorney, Agent, or Firm* — Byrne Poh LLP (57) ABSTRACT

Methods, systems, and media for presenting a reminder to view content are provided. In accordance with some embodiments, a method for presenting a reminder to view content is provided, the method comprising: determining that a message that includes a link to a first content item has been received by a user device; determining whether the link to the content item has been selected; in response to determining that the link to the content item has not been selected, storing metadata associated with the content item; determining that a user is viewing a second content item that is related to the first content item; determining a probability value that indicates a likelihood that the user would be interested in viewing the first content item; and causing an interface that includes a reminder to view the first content item to be presented on the user device.

18 Claims, 5 Drawing Sheets

(56) References Cited

U.S. PATENT DOCUMENTS

2016/0162487 A1* 6/2016 Moghbel ............. G06F 17/3053
  707/723
2017/0038933 A1* 2/2017 Hoskins ................ G06F 3/0484

OTHER PUBLICATIONS

International Preliminary Report on Patentability dated Sep. 4, 2018 in International Patent Application No. PCT/US2016/066170.
Examination Report dated Mar. 7, 2019 in EP Patent Application No. 16823102.5.
Summons to Attend Oral Proceedings dated Jul. 17, 2019 in EP Patent Application No. 16823102.5.

* cited by examiner

METHODS, SYSTEMS, AND MEDIA FOR PRESENTING A REMINDER TO VIEW CONTENT

TECHNICAL FIELD

The disclosed subject matter relates to methods, systems, and media for presenting a reminder to view content.

BACKGROUND

People often receive links to videos from their friends, for example, in text messages, e-mails, or instant message chats. In some instances, the time when the message is received might not be a good time to watch the video. However, it can be difficult to remember to watch the video at a more convenient time.

Accordingly, it is desirable to provide new methods, systems, and media for presenting a reminder to view content.

SUMMARY

Methods, systems, and media for presenting a reminder to view content are provided.

In accordance with some embodiments of the disclosed subject matter, a method for presenting a reminder to view content is provided, the method comprising: determining that a message in a communication interface that includes a link to a first content item has been received by a user device; determining, at a first point in time, whether the link to the content item has been selected using the user device; in response to determining that the link to the content item has not been selected, storing metadata associated with the content item in association with an identifier of the user device; determining, at a second point in time, that a user of the user device is viewing a second content item that is related to the first content item based at least in part on the stored metadata; in response to determining that the user of the user device is viewing the second content item that is related to the first content item, determining, using a hardware processor, a probability value that indicates a likelihood that the user would be interested in viewing the first content item; and in response to determining that the probability value is greater than a predetermined threshold value, causing an interface that includes a reminder to view the first content item to be presented on the user device.

In accordance with some embodiments of the disclosed subject matter, a system for presenting a reminder to view content is provided, the system comprising: a hardware processor that is programmed to: determine that a message in a communication interface that includes a link to a first content item has been received by a user device; determine, at a first point in time, whether the link to the content item has been selected using the user device; in response to determining that the link to the content item has not been selected, store metadata associated with the content item in association with an identifier of the user device; determine, at a second point in time, that a user of the user device is viewing a second content item that is related to the first content item based at least in part on the stored metadata; in response to determining that the user of the user device is viewing the second content item that is related to the first content item, determine a probability value that indicates a likelihood that the user would be interested in viewing the first content item; and in response to determining that the probability value is greater than a predetermined threshold value, cause an interface that includes a reminder to view the first content item to be presented on the user device.

In accordance with some embodiments of the disclosed subject matter, a non-transitory computer-readable medium containing computer-executable instructions that, when executed by a processor, cause the processor to perform a method for presenting a reminder to view content is provided. The method comprises: determining that a message in a communication interface that includes a link to a first content item has been received by a user device; determining, at a first point in time, whether the link to the content item has been selected using the user device; in response to determining that the link to the content item has not been selected, storing metadata associated with the content item in association with an identifier of the user device; determining, at a second point in time, that a user of the user device is viewing a second content item that is related to the first content item based at least in part on the stored metadata; in response to determining that the user of the user device is viewing the second content item that is related to the first content item, determining a probability value that indicates a likelihood that the user would be interested in viewing the first content item; and in response to determining that the probability value is greater than a predetermined threshold value, causing an interface that includes a reminder to view the first content item to be presented on the user device.

In accordance with some embodiments of the disclosed subject matter, a system for presenting a reminder to view content is provided, the system comprising: means for determining that a message in a communication interface that includes a link to a first content item has been received by a user device; means for determining, at a first point in time, whether the link to the content item has been selected using the user device; in response to determining that the link to the content item has not been selected, means for storing metadata associated with the content item in association with an identifier of the user device; means for determining, at a second point in time, that a user of the user device is viewing a second content item that is related to the first content item based at least in part on the stored metadata; in response to determining that the user of the user device is viewing the second content item that is related to the first content item, means for determining a probability value that indicates a likelihood that the user would be interested in viewing the first content item; and in response to determining that the probability value is greater than a predetermined threshold value, means for causing an interface that includes a reminder to view the first content item to be presented on the user device.

In some embodiments, the first content item is a video, and the interface that includes the reminder to view the first content item includes a queue of related videos.

In some embodiments, the interface includes a link to the first content item.

In some embodiments, the probability value is determined based at least in part on a duration of time between the first point in time and the second point in time.

In some embodiments, the system further comprises means for determining a type of interface that includes the reminder based at least in part on the probability value.

In some embodiments, the system further comprises means for determining that the second content item is related to the first content item based at least in part on a source of the first content item and the second content item.

BRIEF DESCRIPTION OF THE DRAWINGS

Various objects, features, and advantages of the disclosed subject matter can be more fully appreciated with reference

DETAILED DESCRIPTION

In accordance with various embodiments, mechanisms (which can include methods, systems, and media) for presenting a reminder to view content are provided.

In some embodiments, the mechanisms described herein can receive, on a user device, a message that includes a link to a content item (e.g., a video, a web page, a news article, and/or any other suitable type of content item). The mechanisms can then determine whether or not the link was selected, for example, within a particular period of time. If it is determined that the link was not selected, the mechanisms can cause a reminder to view the content item to be presented on the user device.

In some embodiments, the mechanisms can additionally determine whether or not to present a reminder to view the content item based on any suitable information. For example, in some embodiments, the mechanisms can determine that a reminder is to be presented in response to determining that a user of the user device is currently viewing a related content item (e.g., a content item associated with the same content source, a content item related to a similar topic, and/or related in any other suitable manner). As a more particular example, in some embodiments, the related content item can be a video that is related (e.g., by topic, by creator, by content source, and/or related in any other suitable manner) to the content item corresponding to the link. As another more particular example, in instances where the content item corresponding to the link is an article published by a particular source, the related content item can be a second article that is published by the same source.

In some embodiments, the reminder can be presented using any suitable modality, such as a text message, a push notification, within a user interface indicating a playlist of content items, within a user interface that includes other information (e.g., current weather and/or traffic conditions), and/or in any other suitable manner. In some embodiments, the modality used to present the reminder can be determined based on a probability that the user is likely to be interested in viewing the content associated with the link. For example, in instances where the probability is greater than a predetermined threshold value, the reminder can be presented using a relatively intrusive modality, such as a text message. Alternatively, in instances where the probability is less than a predetermined threshold value, the reminder can be presented using a relatively non-intrusive type of message, such as within a user interface that indicates a playlist of content items.

In some embodiments, a user can affirmatively provide consent for particular types of information to be used. For example, in some embodiments, a user can provide consent to retrieve information from particular sources (e.g., social networking services, a user account associated with a video hosting service, the user's e-mail account, and/or any other suitable source of information) to be used to determine the probability that the user is interested in viewing the video corresponding to the received link. In some embodiments, the user can select and/or deselect particular sources of information at any suitable time.

Figure 1:
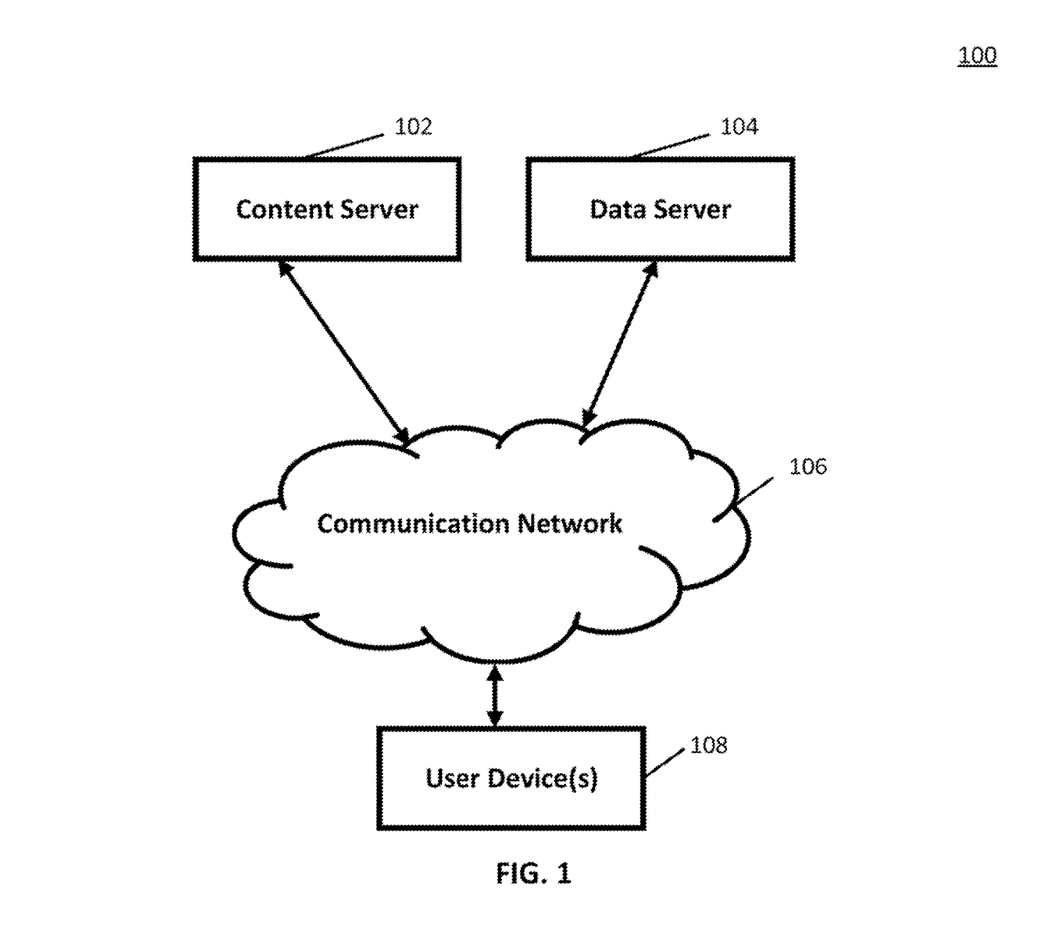
FIG. 1 shows a schematic diagram of an example of a system for presenting a reminder to view content in accordance with some embodiments of the disclosed subject matter.

Turning to FIG. 1, an example 100 of hardware for presenting a reminder to view content that can be used in accordance with some embodiments of the disclosed subject matter is shown. As illustrated, hardware 100 can include one or more servers, such as a content server 102, a data server 104, a communication network 106, and one or more user devices 108.

Content server 102 can be any suitable server for storing content and delivering the content to a user device 108 in some embodiments. For example, content server 102 can be a server that streams media content to user device 108 via communication network 106. As a more particular example, in some embodiments, content server 102 can stream media content to user device 108 in response to receiving a request for the media content from user device 108. Content provided by content server 102 can be any suitable content, such as video content, audio content, television programs, movies, cartoons, sound effects, audiobooks, web pages, news articles, streaming live content (e.g., a streaming radio show, a live concert, and/or any other suitable type of streaming live content), electronic books, search results and/or any other suitable type of content. Content can be created and uploaded to content server 102 by any suitable entity.

Data server 104 can be any suitable server for storing information related to a user's preferences for viewing content, information related to content a user has previously watched, and/or any other suitable information. In some embodiments, data server 104 can transmit, to a user device, information related to content the user has previously watched, as described below in connection with FIG. 3. For example, in some embodiments, data server 104 can transmit information indicating that the content item associated with the link has already been viewed from a user account associated with the user device. As another example, in some embodiments, data server 104 can transmit information indicating that a content item similar to the content item associated with the link (e.g., based on metadata associated with the two content items, based on identities of the creators of the two content items, based on common viewers of the two content items, and/or based on any other suitable information) has been viewed from a user account associated with the user device. Note that, in some embodiments, authorization can be requested from a user before information relating to the user's preferences and/or content viewing habits is stored on data server 104.

Communication network 106 can be any suitable combination of one or more wired and/or wireless networks in some embodiments. For example, communication network 106 can include any one or more of the Internet, a mobile data network, a satellite network, a local area network, a wide area network, a telephone network, a cable television network, a WiFi network, a WiMax network, and/or any other suitable communication network.

User device(s) 108 can include any one or more user devices suitable for receiving messages and/or presenting content. For example, in some embodiments, user device(s) 108 can include mobile devices, such as a mobile phone, a tablet computer, a laptop computer, a vehicle (e.g., a car, a boat, an airplane, or any other suitable vehicle) entertainment system, a portable media player, or any other suitable mobile device. As another example, in some embodiments, user device(s) 108 can include non-mobile devices such as a desktop computer, a set-top box, a television, a streaming media player, a game console, or any other suitable non-mobile device.

Although content server 102 and data server 104 are illustrated as separate devices, any one or more of these devices can be combined into one device in some embodiments. Also, although only one each of content server 102 and data server 104 are shown in FIG. 1 to avoid over-complicating the figure, any suitable one or more of each device can be used in some embodiments.

Although only one user device 108 is shown in FIG. 1 to avoid over-complicating the figure, any suitable number of each of these devices, and any suitable types of these devices, can be used in some embodiments.

Content server 102, data server 104, and user device 108 can be implemented using any suitable hardware in some embodiments. For example, in some embodiments, devices 102, 104, and 108 can be implemented using any suitable general purpose computer or special purpose computer. For example, a server may be implemented using a special purpose computer. Any such general purpose computer or special purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Figure 2:
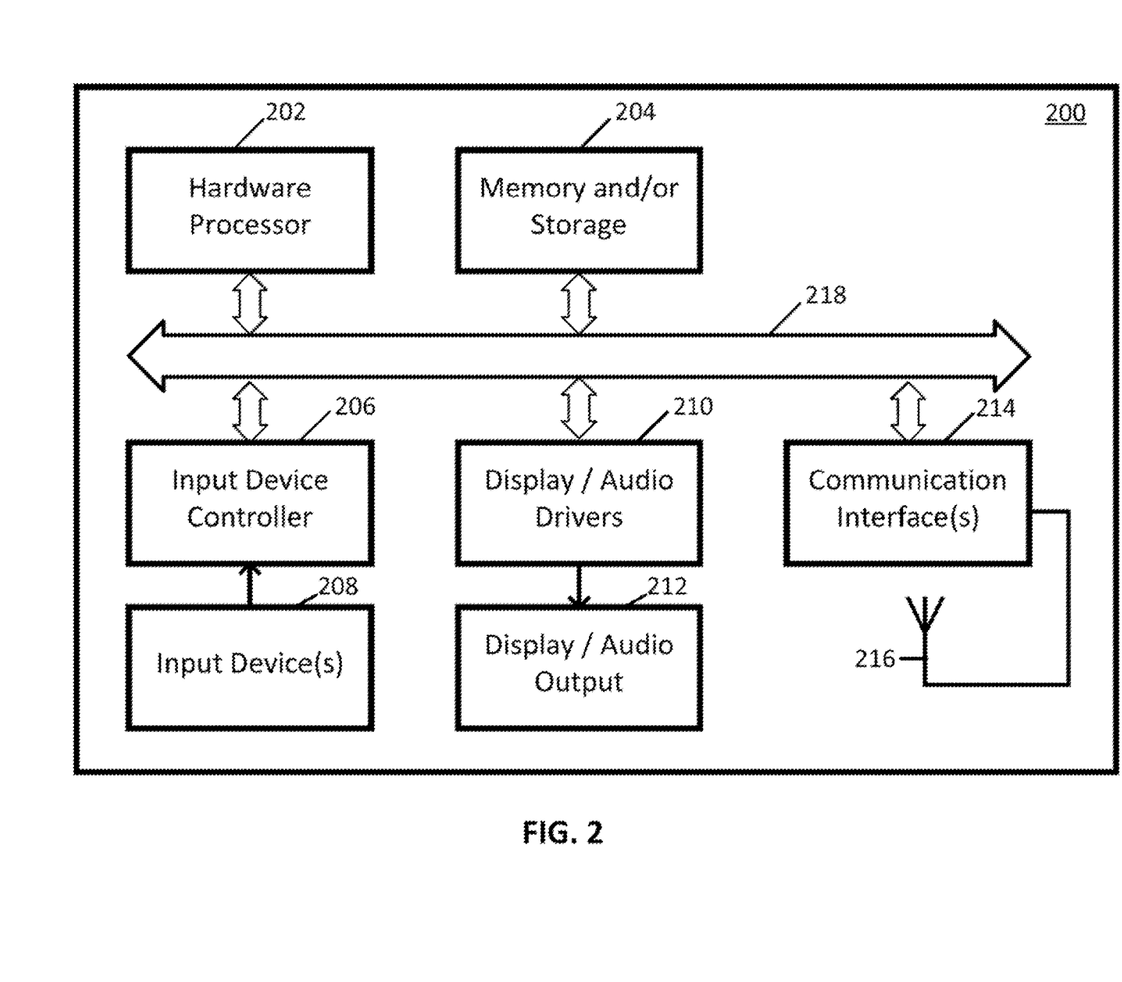
FIG. 2 shows an example of hardware that can be used in a server and/or a user device in accordance with some embodiments of the disclosed subject matter.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 204 can be any suitable memory and/or storage for storing programs, data, media content, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some embodiments. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some embodiments. For example, display/audio drivers 210 can be circuitry for driving an LCD display, a speaker, an LED, or any other type of output device.

Communication interface(s) 214 can be any suitable circuitry for interfacing with one or more communication networks, such as network 106 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can be included in hardware 200 in accordance with some embodiments.

Figure 3:
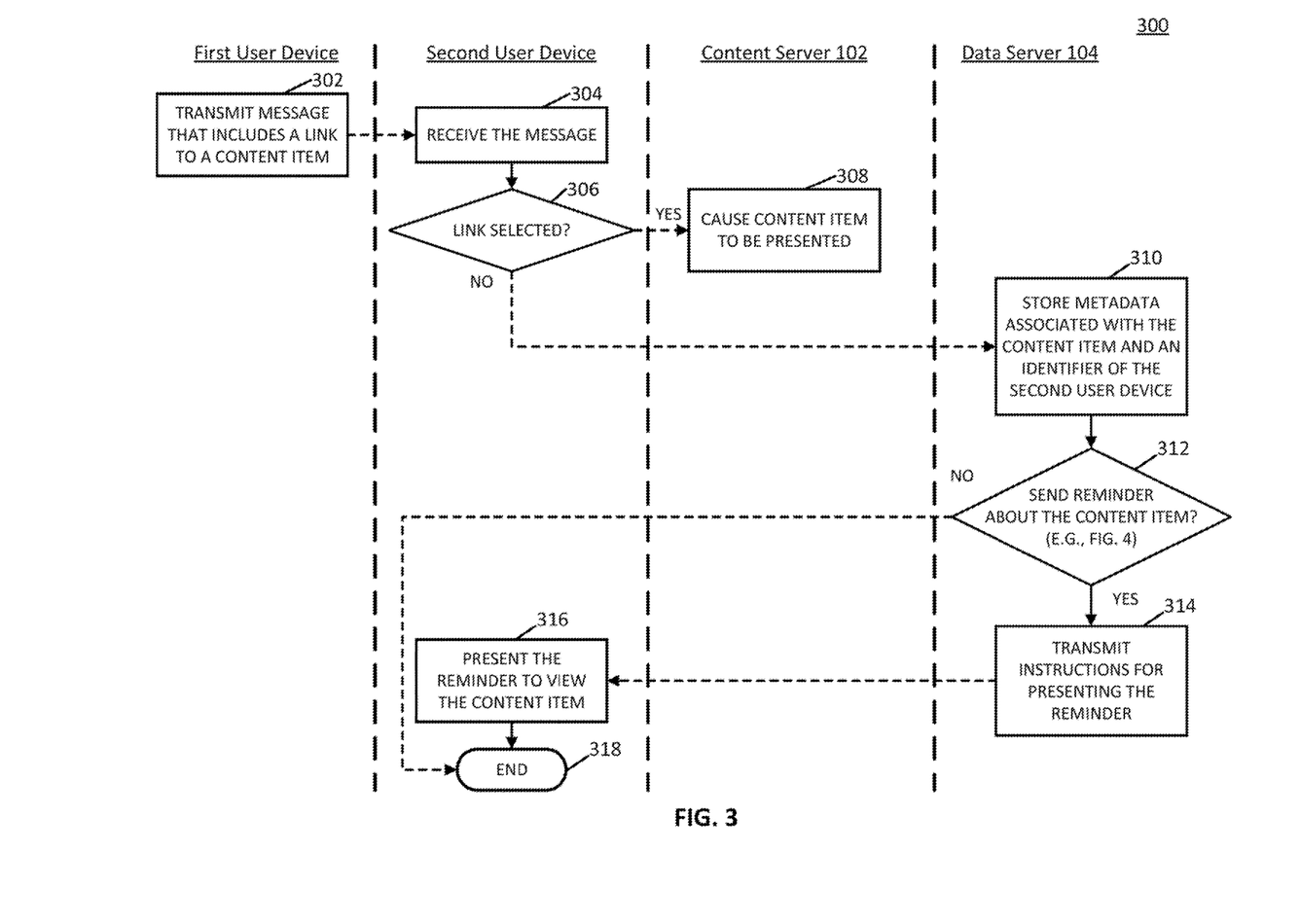
FIG. 3 shows an example of an information flow diagram for presenting a reminder to view content in accordance with some embodiments of the disclosed subject matter.

Turning to FIG. 3, an example 300 of an information flow diagram for presenting a reminder to view content is shown in accordance with some embodiments of the disclosed subject matter. As illustrated, blocks of information flow diagram 300 can be implemented on a first user device, a second user device, content server 102, and/or data server 104.

At 302, the first user device can transmit a message that includes a link to a content item (e.g., a video, a television program, an e-book, a news article, a web page, and/or any other suitable type of content). In some embodiments, the message can include any suitable type of communication, such as a text message, an e-mail, a chat and/or an instant message, a comment on a post on a social networking site, a tag that indicates a user of the second user device on a post on a social networking site that includes the link to the content item, and/or any other suitable type of message. In some embodiments, the message can include any other suitable content, such as text, images, icons, graphics, animations, and/or any other suitable content.

Figure 5A:
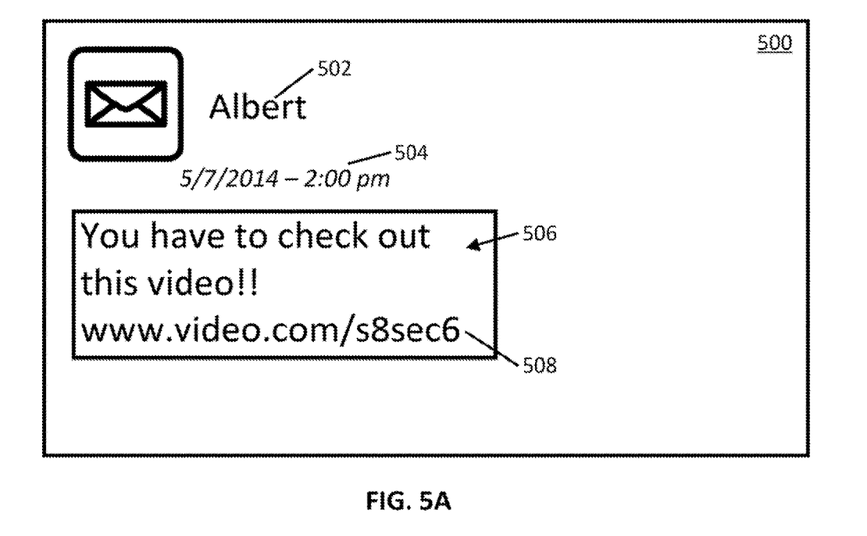
FIGS. 5A and 5B show examples of user interfaces for receiving a link to a video and presenting a reminder to view the video in accordance with some embodiments of the disclosed subject matter.

At 304, the second user device can receive the message. In some embodiments, the message can be displayed by the second user device upon receipt. Alternatively, in some embodiments, the second user device can cause a notification of the received message to be presented, and can cause the message to be presented in response to determining that an indication to present the message has been received (e.g., by determining that the notification has been selected, by determining that an application associated with a particular type of message has been selected, and/or based on any other suitable type of indication). FIG. 5A shows an example of a user interface for presenting the received message on the second user device.

At 306, the second user device can determine whether the link in the received message has been selected. In some embodiments, the second user device can use any suitable technique(s) to determine whether the link has been selected. For example, in some embodiments, the second user device can determine if a web page corresponding to the link has been opened on the user device. As another example, in some embodiments, the second user device can determine if the message was closed or dismissed without the link having been selected. In some embodiments, the second user device can determine if the link was selected and/or if the message was closed within a predetermined period of time (e.g., within two minutes of the message being received and/or opened, within ten minutes of the message being received and/or opened, within twenty minutes of the message being received and/or opened, and/or any other suitable time period).

If, at 306, it is determined that the link has been selected ("yes" at 306), content server 102 can cause the content item associated with the link to be presented on the second user device at 308. For example, in some embodiments, content server 102 can cause the content item to be transmitted to the second user device via communication network 106.

If, at 306, it is determined that the link has not been selected ("no" at 306), data server 104 can store metadata associated with the content item and an identifier of the second user device at 310. In some embodiments, the identifier of the second user device can be based on any suitable information, such as a username associated with a user account authenticated on the second user device, a device type associated with the second user device, and/or any other suitable information. In some embodiments, the metadata associated with the content item can indicate any suitable information, such as a title of the content item, an author and/or creator of the content item, a date of publication and/or creation of the content item, one or more topics associated with the content item, one or more keywords associated with the content item, a name of a content sharing service and/or web site on which the content item is stored, and/or any other suitable information.

At 312, data server 104 can determine whether a reminder to view the content item is to be presented on the second user device. In some embodiments, data server 104 can determine whether the reminder is to be presented at any suitable time after the message including the link to the content item was received by the second user device (e.g., a day later, two days later, a week later, and/or any other suitable time period). In some embodiments, data server 104 can determine whether the reminder is to be presented based on any suitable information and using any suitable technique(s). For example, in some embodiments, the determination can be made based on a duration of time elapsed since the message was received by the second user device, recent content accessed by the second user device, and/or any other suitable information. A more particular example of a process for determining whether a reminder is to be presented on the second user device is shown in and described below in connection with FIG. 4.

Note that, in some embodiments, process 300 can first determine whether the second user device is accessing content related to the content item corresponding to the link included in the message received at block 304, and can determine whether the reminder to view the content item is to be presented in response to determining that related content is currently being accessed on the second user device. Process 300 can determine that related content is being accessed using any suitable information, for example, the metadata stored at block 310, information indicating a source of the content item and/or currently accessed content, and/or any other suitable information. A more particular example of techniques for determining whether currently accessed content is related to the content item corresponding to the link is described below in connection with block 402 of FIG. 4.

If, at 312, data server 104 determines that no reminder is to be presented on the second user device ("no" at 312), information flow diagram 300 can end at 318.

If, at 312, data server 104 determines that a reminder is to be presented on the second user device ("yes" at 312), data server 104 can transmit instructions to present the reminder on the second user device at 314. In some embodiments, the reminder can be presented in any suitable manner. For example, in some embodiments, the reminder can be presented as an indication that a user associated with the first user device recommended the content item. As a more particular example, in some embodiments, the reminder can be presented in a user interface that includes a group of content that is recommended for a user of the second user device and/or a queue of content that will be automatically presented on the second user device, as shown in and described below in connection with FIG. 5B. As another more particular example, in some embodiments, the reminder can be included in a push notification presented on the second user device. As yet another more particular example, in some embodiments, the reminder can be presented within a user interface presented on the second user device that additionally includes any other suitable information, such as local traffic conditions, local weather conditions, other reminders (e.g., reminders of upcoming meetings, and/or any other suitable reminders), and/or any other suitable information.

In some embodiments, data server 104 can determine a type of format (e.g., presented within a push notification, presented within a user interface indicating other recommended content, and/or any other suitable type of format as described above) using any suitable technique(s) and any suitable information. For example, in some embodiments, if the content associated with the link is a video content item hosted on a particular video sharing service, data server 104 can determine that the reminder is to be presented in connection with a user interface indicating content that is to be automatically presented in connection with the video sharing service, as shown in and described below in connection with FIG. 5B. As another example, in some embodiments, data server 104 can determine the type of format based on user preferences. As a more particular example, if data server 104 determines that a user is likely to view push notifications and/or select content indicated in a push notification, data server 104 can determine that the reminder is to be presented within a push notification. As another more particular example, if data server 104 determines that a user of the second user device frequently dismisses and/or closes interfaces of a particular type of message format without viewing the message or selecting links included in the message, data server 104 can determine that particular type of message format is not to be used in connection with the reminder.

At 316, the second user device can receive the transmitted instructions from data server 104, and can cause the reminder to view the content item to be presented. A more particular example of a user interface that includes a reminder to view a content item is shown in and described below in connection with FIG. 5B.

Information flow diagram 300 can end at 318.

Figure 4:
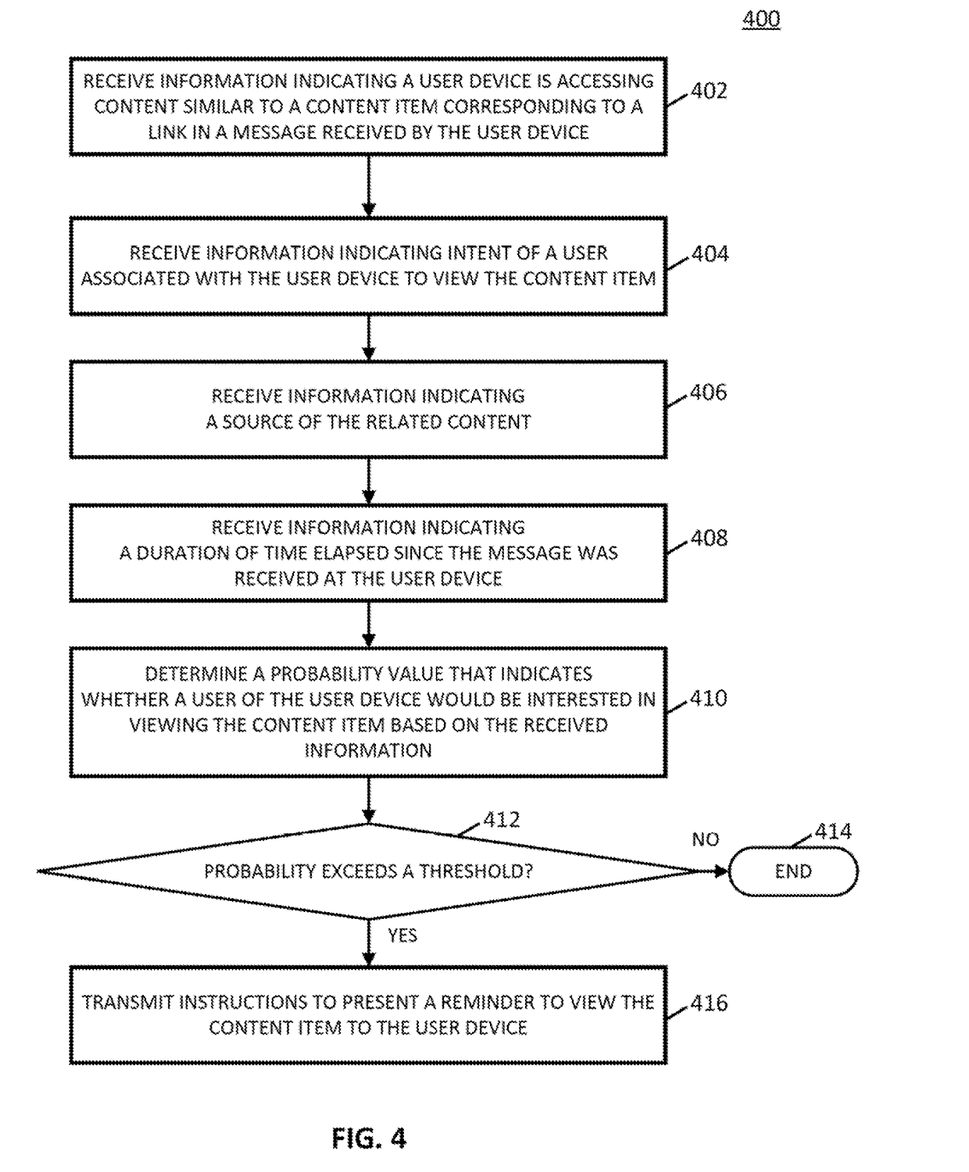
FIG. 4 shows an example of a process for presenting a reminder to view content in accordance with some embodiments of the disclosed subject matter.

Turning to FIG. 4, an example 400 of a process for determining whether to present a reminder to view a content item is shown in accordance with some embodiments of the disclosed subject matter. In some embodiments, blocks of process 400 can be implemented on content server 102 and/or data server 104.

Process 400 can begin at 402 by receiving information indicating that a user device that received a message that includes a link to a content item (e.g., the second user device shown in and described above in connection with FIG. 3) is accessing content similar to the content item corresponding to the link. The related content can be related to the content item in any suitable manner. For example, in some embodiments, a content type associated with the accessed content can be the same as the content type associated with the content item corresponding to the link. As a more particular example, in some embodiments, both content items can be videos, television programs, movies, e-books, articles, and/or any other suitable type of content. As another example, in some embodiments, the accessed content can be associated with the same source as the content item corresponding to the link. As a more particular example, in some embodiments, both content items can be hosted on the same content sharing service, hosted by the same website, shared in the same group on a social networking service, published by the same entity (e.g., the same online newspaper, the same blog, and/or any other suitable entity), and/or any other suitable source of content. As yet another example, in some embodiments, the accessed content can be related to a similar topic as the content item corresponding to the link. As a more particular example, in some embodiments, both content items can be associated with one or more similar keywords that indicate topics of the content items.

Process 400 can determine that related content is being accessed using any suitable technique(s). For example, in some embodiments, process 400 can identify the content that is being accessed based on activities associated with a user account authenticated with the user device corresponding to a content sharing service and/or a social networking service. As a more particular example, in some embodiments, process 400 can identify media content hosted on a particular video sharing service that is currently being viewed by a user associated with the user account. As another example, in some embodiments, process 400 can identify the content based on a URL and/or a website that is currently being accessed by the user device. As yet another example, in some embodiments, process 400 can determine if the accessed content is related to the content item corresponding to the link based on the metadata associated with the content item identified and stored in association with an identifier of a user account corresponding to the received message, as shown in and described above in connection with block 310 of FIG. 3.

Process 400 can receive information indicating intent of a user to view the content item corresponding to the link in the message received by the user device at 404. In some embodiments, the information can be based on the user's previous responses to messages received from the sender. For example, in some embodiments, process 400 can determine a proportion of previously received links to content received from the same sender that have been selected by the user. As a more particular example, in some embodiments, process 400 can determine that the user is more likely to intend to view the content item in instances where the user has previously selected links received from the sender. As a specific example, process 400 can estimate a likelihood that the user intends to view the content item based on a proportion of links received from the sender that the user has previously selected. As another example, in some embodiments, process 400 can estimate a strength of a relationship between the recipient of the message and the sender of the message, based on any suitable information, such as a number of groups both users belong to in a social networking site, a number of messages exchanged between the two users, a frequency at which messages have been exchanged between the two users, and/or any other suitable information. As a more particular example, in some embodiments, process 400 can determine that the user is more likely to intend to view the content item in instances where the strength of the relationship between the user and the send of the message is relatively high. As yet another example, in instances where the user has provided consent, process 400 can determine that the user is more likely to intend to view the content item in instances where the user has sent a positive message in reply to the received message. As a more particular example, in some embodiments, process 400 can parse the message sent in reply for words and/or phrases indicating an intent to view the content item in the future (e.g., "looks interesting," "I'll look at that later tonight," and/or any other suitable words or phrases).

At 406, process 400 can receive information indicating a source of the related content being accessed at 402. For example, as described above in connection with block 402, process 400 can identify a name of a website, a name of a publication, a name of content sharing service, a name of a creator of the content, and/or any other suitable entity associated with the related content.

Process 400 can receive information indicating a duration of time (e.g., an hour, a day, a week, and/or any other suitable duration of time) elapsed since the message was received by the user device at 408. For example, in some embodiments, process 400 can determine an elapsed time between the time the message was received and a current point in time.

Process 400 can determine a probability value that indicates whether a user of the user device would be interested in viewing the content item based on the information received at blocks 402-408. The information can be combined in any suitable manner to calculate the probability value. For example, in some embodiments, information from different factors (e.g., information indicating user intent, information indicating a source of the content, a duration of elapsed time since the message was received, and/or any other suitable factors) can be indicated by a score, and the scores associated with each factor can be combined using any suitable technique(s) (e.g., a weighted average of the scores, and/or any other suitable technique).

As a particular example, in some embodiments, process 400 can determine that there is a relatively high likelihood of the user being interested in viewing the content item in instances where there is a relatively strong relationship between the user and the sender of the message. As another particular example, in some embodiments, process 400 can determine that there is a relatively low likelihood of the user being interested in viewing the content in instances where the duration of elapsed time since the message was received exceeds a predetermined threshold (e.g., received more than a week ago, received more than a month ago, and/or any other suitable time period). As yet another particular example, in some embodiments, process 400 can determine that there is a relatively high likelihood of the user being interested in viewing the content if a relevance score of content currently being accessed to the content item associated with the message exceeds a predetermined threshold. Note that, in such embodiments, the relevance score can be calculated based on any suitable information, such as metadata indicating a source of the content, a creator of the content, keywords associated with the content, and/or any other suitable information. Additionally, note that, in some embodiments, likelihoods of the user being interested in viewing the content that are calculated based on different factors can be combined in any suitable manner (e.g., a weighted average). In some embodiments, weights associated with each factor can be modified over time, for example, based on whether the user views the content item after receiving the reminder.

Note that, in some embodiments, any other suitable information can be used by process 400 to calculate the probability value indicating the likelihood of the user being interested in view the content item. For example, in some embodiments, process 400 can use information indicating popularity of the content item (e.g., a number of times the content item has been viewed, a number of times the content item has been shared on a social networking site, a number of time the content item has been commented on, and/or any other suitable metric) to calculate the probability value. As another example, in some embodiments, process 400 can determine popularity information particular to connections of the user on a social networking site. As a more particular example, process 400 can determine a number of connections of the user that have viewed, endorsed, shared, and/or commented on the content item.

At 412, process 400 can determine whether the probability value calculated at block 410 exceeds a predetermined threshold value. In some embodiments, the predetermined threshold value can be any suitable value (e.g., 0.3, 0.5, 0.75, 0.9, and/or any other suitable value).

If, at 412, it is determined that the probability value does not exceed the predetermined threshold value ("no" at 412), process 400 can end at 414.

If, at 412, it is determined that the probability value exceeds the predetermined threshold value ("yes" at 412), process 400 can transmit instructions to present a reminder to view the content item to the user device at 416. As described above in connection with FIG. 3, the instructions can cause the reminder to be presented in any suitable manner. For example, in some embodiments, the instructions can cause the reminder to be presented as a push notification, in a text message, in a user interface that includes any other suitable content (e.g., information indicating weather, traffic, other reminders, and/or any other suitable content), in a user interface that indicates content that will be automatically played in a playlist (e.g., as shown in and described below in connection with FIG. 5B), in a user interface that indicates content that is recommended for the user, and/or in any other suitable manner.

Note that, in some embodiments, prior to transmitting the instructions to present the reminder to view the content item, process 400 can determine the manner in which the reminder is to be presented. In some such embodiments, the manner of presentation can be determined based on any suitable information. For example, in some embodiments, the manner of presentation can be determined based on the probability value calculated at block 410. As a more particular example, process 400 can select a particular type of notification (e.g., a text message and/or push notification) if the probability value is greater than a predetermined threshold value (e.g., greater than 0.8), indicating that there is a high likelihood that the user will want to watch the video after receiving the reminder. As another more particular example, process 400 can select a different type of notification (e.g., a reminder within a user interface indicating a queue of content items) if the probability value is within a particular range (e.g., between 0.5 and 0.6, and/or any other suitable range).

As another example, in some embodiments, the manner of presentation can be determined based on information indicating a user's previous actions in response to receiving notifications of different modalities. As a more particular example, in instances where it is determined that a user frequently selects links included in push notifications, process 400 can determine that the reminder is to be included in a push notification. Note that, in some embodiments, any suitable factors used to determine the manner in which the reminder is to be presented can be updated over time based on a user's actions in response to receiving previous reminders of content to view.

As yet another example, in some embodiments, the manner of presentation of the reminder can be determined based on a type of content associated with the content item. As a more particular example, in instances where the type of content includes video content and/or audio content, the reminder can be presented in connection with a user interface that includes suggested content and/or content that is in a queue that will be presented automatically (e.g., a playlist). As another more particular example, in instances where the type of content includes primarily still content (e.g., a link to a website, a news article, and/or any other suitable type of content), the reminder can be presented in a text message and/or a push notification).

Note that, in some embodiments, process 400 can determine the manner of presentation of the reminder using any suitable combination of information (e.g., the probability value, the user's previous actions, the type of content, and/or any other suitable information), and the information can be combined in any suitable manner.

Turning to FIG. 5A, an example 500 of a user interface for presenting a received message that includes a link to a video is shown in accordance with some embodiments of the disclosed subject matter. As illustrated, user interface 500 can include a sender name 502, a message timestamp 504, a message 506, and a link 508.

Sender name 502 can include an indication of an identity of the sender of message 506. For example, as shown in FIG. 5A, sender name 502 can include text that indicates the identity of the sender. In some embodiments, sender name 502 can include any suitable images, icons, graphics, animations, and/or any other suitable content. In some embodiments, sender name 502 can be omitted.

Message timestamp 504 can include any indication of a time that message 506 was received. For example, as shown in FIG. 5A, message timestamp 504 can include a date and/or a time of day. In some embodiments, message timestamp 504 can be omitted.

As described above in connection with FIGS. 3 and 4, message 506 can be a message of any communication type. In some embodiments, message 506 can include link 508 as well as any other suitable content, such as text, images, icons, graphics, animations, and/or any other suitable content. Link 508 can be a link to media content, such as a video. In some embodiments, link 508 can be a hyperlink to any suitable web site and/or media content hosting service. In some embodiments, link 508 can be hidden, and a particular image and/or word(s) of message 506 can be hyperlinked to the video.

Figure 5B:
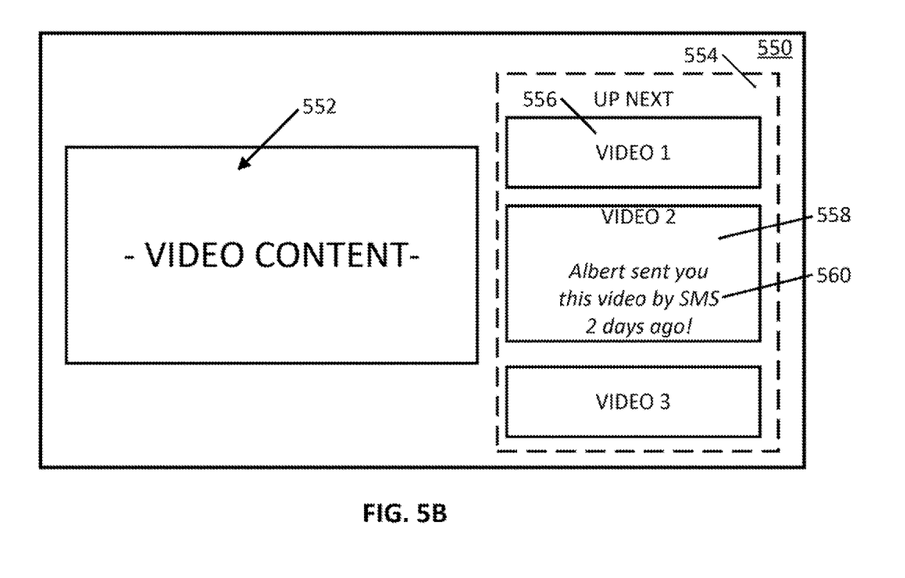

Turning to FIG. 5B, an example 550 of a user interface that includes a reminder to view the media content item corresponding to a link included in a message is shown in accordance with some embodiments of the disclosed subject matter. As shown, user interface 550 can include video content 552 and a playlist panel 554.

Video content 552 can be any suitable presentation of video content. In some embodiments, video content 552 can be presented within a video player window, which can include any suitable video player controls, such as a pause input, a rewind input, a fast-forward input, a volume control, and/or any other suitable controls.

Playlist panel 554 can be any suitable user interface for indicating content that will begin being presented. For example, in some embodiments, playlist panel 554 can indicate content that was aggregated into a user-created playlist. As another example, in some embodiments, playlist panel 554 can indicate content that was identified as related to video content 554 and will begin playing automatically after presentation of video content 554 finishes. Note that, in some embodiments, playlist panel 554 can be omitted. Additionally or alternatively, in some embodiments, a panel indicating content that is recommended for the user (e.g., based on video content 554, and/or based on any other suitable information) can be presented in user interface 550.

Playlist panel 554 can include indications of one or more media content items, such as videos 556 and 558. In some embodiments, each indication can include any suitable information, such as a name of the media content, a creator of the media content, a date of creation of the media content, an image associated with the media content, and/or any other suitable information. In some embodiments, a video (e.g., video 558) corresponding to link 508 (included in message 506, as shown in and described above in connection with FIG. 5A) can be presented with a reminder, such as reminder 560. As shown in FIG. 5B, reminder 560 can include any suitable information, such as a name of a sender of message 506, a date on which message 506 was sent, an amount of time elapsed since message 506 was sent, a modality by which message 506 was sent, an image associated with the sender of message 506, and/or any other suitable information.

It should be understood that at least some of the above described blocks of the processes of FIGS. 3 and 4 can be executed or performed in any order or sequence not limited to the order and sequence shown in and described in the figure. Also, some of the above blocks of the processes of FIGS. 3 and 4 can be executed or performed substantially simultaneously where appropriate or in parallel to reduce latency and processing times. Additionally or alternatively, some of the above described blocks of the processes of FIGS. 3 and 4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described here collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for presenting a reminder to view content are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting a reminder to view content, comprising:
   determining that a message in a communication interface that includes a link to a first content item has been received by a user device;
   determining, at a first point in time, whether the link to the first content item has been selected using the user device;
   in response to determining that the link to the first content item has not been selected, storing metadata associated with the content item in association with an identifier of the user device;
   determining, at a second point in time, that a user of the user device is viewing a second content item that is related to the first content item based at least in part on the stored metadata;
   in response to determining that the user of the user device is viewing the second content item that is related to the first content item, determining, using a hardware processor, a probability value that indicates a likelihood that the user would be interested in viewing the first content item; and
   in response to determining that the probability value is greater than a predetermined threshold value, causing an interface that that is presented along with the second content item, wherein the interface includes a queue of related content items including the first content item, wherein the first content item in the queue of related content items includes a reminder to view the first content item to be presented on the user device, and wherein the reminder includes an identifier associated with a sender of the message that included the link to the first content item, a modality in which the message was sent, and timing information associated with when the message was sent.

2. The method of claim 1, wherein the first content item is a video, and wherein the queue of related content items includes a queue of related videos.

3. The method of claim 1, wherein the interface includes a link to the first content item.

4. The method of claim 1, wherein the probability value is determined based at least in part on a duration of time between the first point in time and the second point in time.

5. The method of claim 1, further comprising selecting a particular type of a notification that includes the reminder based at least in part on the probability value.

6. The method of claim 1, further comprising determining that the second content item is related to the first content item based at least in part on a source of the first content item and the second content item.

7. A system for presenting a reminder to view content, the system comprising:

a hardware processor that is programmed to:
  determine that a message in a communication interface that includes a link to a first content item has been received by a user device;
  determine, at a first point in time, whether the link to the first content item has been selected using the user device;
  in response to determining that the link to the first content item has not been selected, store metadata associated with the first content item in association with an identifier of the user device;
  determine, at a second point in time, that a user of the user device is viewing a second content item that is related to the first content item based at least in part on the stored metadata;
  in response to determining that the user of the user device is viewing the second content item that is related to the first content item, determine a probability value that indicates a likelihood that the user would be interested in viewing the first content item; and
  in response to determining that the probability value is greater than a predetermined threshold value, cause an interface that that is presented along with the second content item, wherein the interface includes a queue of related content items including the first content item, wherein the first content item in the queue of related content items includes a reminder to view the first content item to be presented on the user device, and wherein the reminder includes an identifier associated with a sender of the message that included the link to the first content item, a modality in which the message was sent, and timing information associated with when the message was sent.

8. The system of claim 7, wherein the first content item is a video, and wherein the queue of related content items includes a queue of related videos.

9. The system of claim 7, wherein the interface includes a link to the first content item.

10. The system of claim 7, wherein the probability value is determined based at least in part on a duration of time between the first point in time and the second point in time.

11. The system of claim 7, wherein the hardware processor is further programmed to select a particular type of a notification that includes the reminder based at least in part on the probability value.

12. The system of claim 7, wherein the hardware processor is further programmed to determine that the second content item is related to the first content item based at least in part on a source of the first content item and the second content item.

13. A non-transitory computer-readable medium containing computer executable instructions that, when executed by a processor, cause the processor to perform a method for presenting a reminder to view content, the method comprising:
  determining that a message in a communication interface that includes a link to a first content item has been received by a user device;
  determining, at a first point in time, whether the link to the first content item has been selected using the user device;
  in response to determining that the link to the first content item has not been selected, storing metadata associated with the first content item in association with an identifier of the user device;
  determining, at a second point in time, that a user of the user device is viewing a second content item that is related to the first content item based at least in part on the stored metadata;
  in response to determining that the user of the user device is viewing the second content item that is related to the first content item, determining a probability value that indicates a likelihood that the user would be interested in viewing the first content item; and
  in response to determining that the probability value is greater than a predetermined threshold value, causing an interface that that is presented along with the second content item, wherein the interface includes a queue of related content items including the first content item, wherein the first content item in the queue of related content items includes a reminder to view the first content item to be presented on the user device, and wherein the reminder includes an identifier associated with a sender of the message that included the link to the first content item, a modality in which the message was sent, and timing information associated with when the message was sent.

14. The non-transitory computer-readable medium of claim 13, wherein the first content item is a video, and wherein the queue of related content items includes a queue of related videos.

15. The non-transitory computer-readable medium of claim 13, wherein the interface includes a link to the first content item.

16. The non-transitory computer-readable medium of claim 13, wherein the probability value is determined based at least in part on a duration of time between the first point in time and the second point in time.

17. The non-transitory computer-readable medium of claim 13, wherein the method further comprises selecting a particular type of a notification that includes the reminder based at least in part on the probability value.

18. The non-transitory computer-readable medium of claim 13, wherein the method further comprises determining that the second content item is related to the first content item based at least in part on a source of the first content item and the second content item.

* * * * *